(12) United States Patent
Chen et al.

(10) Patent No.: US 9,374,414 B2
(45) Date of Patent: Jun. 21, 2016

(54) EMBEDDING GLOBAL AND COLLECTIVE IN A TORUS NETWORK WITH MESSAGE CLASS MAP BASED TREE PATH SELECTION

(71) Applicant: International Business Machines Corporation, Armonk, NY (US)

(72) Inventors: Dong Chen, Croton On Hudson, NY (US); Paul W. Coteus, Yorktown, NY (US); Noel A. Eisley, Yorktown Heights, NY (US); Alan Gara, Mount Kisco, NY (US); Philip Heidelberger, Cortlandt Manor, NY (US); Robert M. Senger, Tarrytown, NY (US); Valentina Salapura, Chappaqua, NY (US); Burkhard Steinmacher-Burow, Esslingen (DE); Yutaka Sugawara, White Plains, NY (US); Todd E. Takken, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 13/975,943

(22) Filed: Aug. 26, 2013

(65) Prior Publication Data

US 2014/0237045 A1 Aug. 21, 2014

Related U.S. Application Data

(62) Division of application No. 12/723,277, filed on Mar. 12, 2010, now Pat. No. 8,521,990.

(60) Provisional application No. 61/293,611, filed on Jan. 8, 2010.

(51) Int. Cl.
*G06F 15/173* (2006.01)
*H04L 29/08* (2006.01)
*G06F 11/34* (2006.01)
(Continued)

(52) U.S. Cl.
CPC ............ *H04L 67/10* (2013.01); *G06F 9/30145* (2013.01); *G06F 11/3024* (2013.01);
(Continued)

(58) Field of Classification Search
CPC ......... H04L 45/16; H04L 51/18; H04L 41/08; H04L 41/0803; H04L 45/46; G06F 9/542; G06F 15/17–15/177; G06F 15/16; G06F 9/522
See application file for complete search history.

(56) References Cited

U.S. PATENT DOCUMENTS 7,380,102 B2 5/2008 Chung et al.
7,920,507 B2 4/2011 Elliott
(Continued)

*Primary Examiner* — Kenneth Kim
(74) *Attorney, Agent, or Firm* — Scully, Scott, Murphy & Presser, P.C.; Daniel P. Morris, Esq.

(57) ABSTRACT

Embodiments of the invention provide a method, system and computer program product for embedding a global barrier and global interrupt network in a parallel computer system organized as a torus network. The computer system includes a multitude of nodes. In one embodiment, the method comprises taking inputs from a set of receivers of the nodes, dividing the inputs from the receivers into a plurality of classes, combining the inputs of each of the classes to obtain a result, and sending said result to a set of senders of the nodes. Embodiments of the invention provide a method, system and computer program product for embedding a collective network in a parallel computer system organized as a torus network. In one embodiment, the method comprises adding to a torus network a central collective logic to route messages among at least a group of nodes in a tree structure.

10 Claims, 12 Drawing Sheets

(51) Int. Cl.
*G06F 11/30* (2006.01)
*G06F 9/30* (2006.01)

(52) U.S. Cl.
CPC .......... *G06F11/348* (2013.01); *G06F 11/3409* (2013.01); *G06F 15/17362* (2013.01); *G06F 15/17381* (2013.01); *G06F 15/17393* (2013.01); *G06F 2201/88* (2013.01)

(56) References Cited

U.S. PATENT DOCUMENTS

| | | | |
|---|---|---|---|
| 8,001,280 B2 | 8/2011 | Blumrich et al. | |
| 2004/0078493 A1* | 4/2004 | Blumrich et al. | 709/250 |
| 2007/0245122 A1* | 10/2007 | Archer et al. | 712/17 |

* cited by examiner

| BYTE NUMBER | FUNCTION |
|---|---|
| 0 | DATA PACKET TYPE: 0x5A |
| 1 | BIT 0-3, COLLECTIVE OP CODE<br>"0000"=AND, "0001"=OR, "0010"=XOR,<br>"0100"=UNSIGNED ADD, "0101"=UNSIGNED MIN, "0110"=UNSIGNED MAX,<br>"1000"=SIGNED ADD, "1001"=SIGNED MIN, "1010"=SIGNED MAX,<br>"1100"=FLOATING POINT ADD, "1101"=FLOATING POINT MIN, "1110"=FLOATING POINT MAX<br>BIT 4-7, COLLECTIVE WORD LENGTH |
| 2 | BIT 0-3, COLLECTIVE CLASS ROUTE<br>BIT 4-6, RESERVED<br>BIT 7, INTERRUPT |
| 3 | BIT 0-2, VIRTUAL CHANNEL (0 DYNAMIC, 1 DETERMINISTIC, 2 HIGH PRIORITY, 3 SYSTEM, 4 USER COLLECTIVE Comm_World, 5 USER COLLECTIVE SUB-COMMUNICATOR, 6 SYSTEM COLLECTIVE)<br>BIT 3-4, COLLECTIVE TYPE ("00" BROADCAST, "11" REDUCE, "10" ALL-REDUCE, "01" RESERVED)<br>BIT 5-7, RESERVED |
| 4-7 | BIT 0-1, RESERVED<br>BIT 2-7, A DESTINATION ADDRESS<br>BIT 8-13, B DESTINATION ADDRESS<br>BIT 14-19, C DESTINATION ADDRESS<br>BIT 20-25, D DESTINATION ADDRESS<br>BIT 26-31, E DESTINATION ADDRESS |
| 8 | BIT 0-1, MESSAGE UNIT PACKET TYPE ("00" FIFO, "01" PUT, "10" GET, "11" PACED-GET)<br>BIT 2, RESERVED<br>BIT 3-7, SIZE |
| 9 | BIT 0-2, RESERVED<br>BIT 3-7, DUPLICATED SIZE |
| 10 | LINK SEQUENCE NUMBER |
| 11 | HEADER 8 BIT CRC |
| 12-31 | MESSAGING UNIT HEADER FIELDS |
|  | DATA PAYLOAD, IN MULTIPLES OF 32 BYTES FROM 0 BYTES (HEADER ONLY PACKET) 32 BYTES, 64 BYTES, ETC, UP TO 512 BYTES. |

NETWORK COLLECTIVE DATA PACKET FORMAT

FIG. 6

| BYTE NUMBER | FUNCTION |
|---|---|
| 0 | DATA PACKET TYPE: 0x55 |
| 1 | HINT BITS FOR DIMENSIONS A-D |
| 2 | BIT 0-1, HINT BITS FOR E DIMENSION<br>BIT 2, ROUTE TO I/O NODE<br>BIT 3-4, RETURN FORM I/O NODE, "01" USE TORUS PORT 6, "10" USE TORUS PORT 7, "11" USE I/O PORT<br>BIT 5, DYNAMIC<br>BIT 6, DEPOSIT<br>BIT 7, INTERRUPT |
| 3 | BIT 0-2, VIRTUAL CHANNEL (0 DYNAMIC, 1 DETERMINISTIC, 2 HIGH PRIORITY, 3 SYSTEM, 4 USER COLLECTIVE Comm_World, 5 USER COLLECTIVE SUB-COMMUNICATOR, 6 SYSTEM COLLECTIVE<br>BIT 3-4, ZONE ROUTING ID<br>BIT 5, STAY ON BUBBLE<br>BIT 6-7, RESERVED |
| 4-7 | BIT 0-1, RESERVED<br>BIT 2-7, A DESTINATION ADDRESS<br>BIT 8-13, B DESTINATION ADDRESS<br>BIT 14-19, C DESTINATION ADDRESS<br>BIT 20-25, D DESTINATION ADDRESS<br>BIT 26-31, E DESTINATION ADDRESS |
| 8 | BIT 0-1, MESSAGE UNIT PACKET TYPE ("00" FIFO, "01" PUT, "10" GET)<br>BIT 2, RESERVED<br>BIT 3-7, SIZE |
| 9 | BIT 0-2, RESERVED<br>BIT 3-7, DUPLICATED SIZE |
| 10 | LINK SEQUENCE NUMBER |
| 11 | HEADER 8 BIT CRC |
| 12-31 | MESSAGING UNIT HEADER FIELDS |
|  | DATA PAYLOAD, IN MULTIPLES OF 32 BYTES FROM 0 BYTES (HEADER ONLY PACKET) 32 BYTES, 64 BYTES, ETC, UP TO 512 BYTES |

NETWORK DATA PACKET FORMAT FOR POINT TO POINT PACKETS

FIG. 7

EMBEDDING GLOBAL AND COLLECTIVE IN A TORUS NETWORK WITH MESSAGE CLASS MAP BASED TREE PATH SELECTION

CROSS-REFERENCE TO RELATED APPLICATIONS

This application is a divisional of co-pending U.S. patent application Ser. No. 12/723,277, filed Mar. 12, 2010, which claims the benefit of U.S. Provisional Patent Application Ser. No. 61/293,611, filed Jan. 8, 2010. The entire content and disclosure of U.S. patent application Ser. No. 12/723,277 and 61/293,611 are hereby incorporated herein by reference.

CROSS REFERENCE

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,367, filed Jan. 8, 2010, now U.S. Pat. No. 8,275,954, issued Sep. 25, 2012, for "USING DMA FOR COPYING PERFORMANCE COUNTER DATA TO MEMORY"; U.S. patent application Ser. No. 12/684,172, filed Jan. 8, 2010, now U.S. Pat. No. 8,275,964, issued Sep. 25, 2012 for "HARDWARE SUPPORT FOR COLLECTING PERFORMANCE COUNTERS DIRECTLY TO MEMORY"; U.S. patent application Ser. No. 12/684,190, filed Jan. 8, 2010, now U.S. Pat. No. 9,069,891, issued Jun. 30, 2015 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, now U.S. Pat. No. 8,468,275, issued Jun. 18, 2013, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, now U.S. Pat. No. 8,347,001, issued Jan. 1, 2013, for "HARDWARE SUPPORT FOR SOFTWARE CONTROLLED FAST MULTIPLEXING OF PERFORMANCE COUNTERS"; U.S. patent application Ser. No. 12/697,799, filed Feb. 1, 2010, now U.S. Pat. No. 8,949,539, issued Feb. 3, 2015, for "CONDITIONAL LOAD AND STORE IN A SHARED CACHE"; U.S. patent application Ser. No. 12/684,738, filed Jan. 8, 2010, now U.S. Pat. No. 8,595,389, issued Nov. 26, 2013, for "DISTRIBUTED PERFORMANCE COUNTERS"; U.S. patent application Ser. No. 12/696,780, filed Jan. 29, 2010, now U.S. Pat. No. 8,103,910, issue Jan. 24, 2012, for "LOCAL ROLLBACK FOR FAULT-TOLERANCE IN PARALLEL COMPUTING SYSTEMS"; U.S. patent application Ser. No. 12/684,860, filed Jan. 8, 2010, now U.S. Pat. No. 8,447,960, issued May 21, 2013, for "PAUSE PROCESSOR HARDWARE THREAD UNTIL PIN TO PROCESSOR WAKE ON PIN"; U.S. patent application Ser. No. 12/684,174, filed Jan. 8, 2010, now U.S. Pat. No. 8,268,389, issued Sep. 18, 2012, for "PRECAST THERMAL INTERFACE ADHESIVE FOR EASY AND REPEATED, SEPARATION AND REMATING"; U.S. patent application Ser. No. 12/684,184, filed Jan. 8, 2010, now U.S. Pat. No. 8,359,404, issued Jan. 22, 2013 (YOR920090527US1, for "ZONE ROUTING IN A TORUS NETWORK"; U.S. patent application Ser. No. 12/684,852, filed Jan. 8, 2010, for "PROCESSOR WAKEUP UNIT TO PROCESSOR RESUME UNIT"; U.S. patent application Ser. No. 12/684,642, filed Jan. 8, 2010, now U.S. Pat. No. 8,429,377, issued Apr. 23, 2013, for "TLB EXCLUSION RANGE"; U.S. patent application Ser. No. 12/684,804, filed Jan. 8, 2010, now U.S. Pat. No. 8,356,122, issued Jan. 15, 2013, for "DISTRIBUTED TRACE USING CENTRAL PERFORMANCE COUNTER MEMORY"; U.S. patent application Ser. No. 13/008,602, filed Jan. 18, 2011, now U.S. Pat. No. 8,868,837, issued Oct. 21, 2014, for "PARTIAL CACHE LINE SPECULATION SUPPORT"; U.S. patent application Ser. No. 12/986,349, filed Jan. 7, 2011, now U.S. Pat. No. 8,473,683, issued Jun. 25, 2013, for "ORDERING OF GUARDED AND UNGUARDED STORES FOR NO-SYNC I/O"; U.S. patent application Ser. No. 12/693,972, filed Jan. 26, 2010, now U.S. Pat. No. 8,458,267, issued Jun. 4, 2013, for "DISTRIBUTED PARALLEL MESSAGING FOR MULTIPROCESSOR SYSTEMS"; U.S. patent application Ser. No. 12/688,747, filed Jan. 15, 2010, now U.S. Pat. No. 8,086,766, issued Dec. 27, 2011, for "SUPPORT FOR NON-LOCKING PARALLEL RECEPTION OF PACKETS BELONGING TO THE SAME MESSAGE"; U.S. patent application Ser. No. 12/688,773, filed Jan. 15, 2010, now U.S. Pat. No. 8,571,834, issued Oct. 29, 2013, for "OPCODE COUNTING FOR PERFORMANCE MEASUREMENT"; U.S. patent application Ser. No. 12/684,776, filed Jan. 8, 2010, now U.S. Pat. No. 8,977,669, issued Mar. 10, 2015, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, filed Jan. 10, 2011, now U.S. Pat. No. 9,081,501, issued Jul. 14, 2015, for "A MULTI-PETASCALE HIGHLY EFFICIENT PARALLEL SUPERCOMPUTER"; U.S. patent application Ser. No. 12/984,252, filed Jan. 4, 2011, now U.S. Pat. No. 8,533,399, issued Sep. 10, 2013, for "CACHE DIRECTORY LOOK-UP REUSE"; U.S. patent application Ser. No. 13/008,502, filed Jan. 18, 2011, now U.S. Pat. No. 8,621,478, issued Dec. 31, 2013, for "MEMORY SPECULATION IN A MULTI LEVEL CACHE SYSTEM"; U.S. patent application Ser. No. 13/008,583, filed Jan. 18, 2011, now U.S. Pat. No. 8,751,748, issued Jun. 10, 2014, for "METHOD AND APPARATUS FOR CONTROLLING MEMORY SPECULATION BY LOWER LEVEL CACHE"; U.S. patent application Ser. No. 12/984,308, filed Jan. 4, 2011, now U.S. Pat. No. 8,838,906, issued Sep. 16, 2014, for "MINIMAL FIRST LEVEL CACHE SUPPORT FOR MEMORY SPECULATION MANAGED BY LOWER LEVEL CACHE"; U.S. patent application Ser. No. 12/984,329, filed Jan. 4, 2011, now U.S. Pat. No. 8,832,415, issued Sep. 9, 2014, for "PHYSICAL ADDRESS ALIASING TO SUPPORT MULTI-VERSIONING IN A SPECULATION-UNAWARE CACHE"; U.S. patent application Ser. No. 12/696,825, filed Jan. 29, 2010, now U.S. Pat. No. 8,255,633, issued Aug. 28, 2012, for "LIST BASED PREFETCH"; U.S. patent application Ser. No. 12/684,693, filed Jan. 8, 2010, now U.S. Pat. No. 8,347,039, issued Jan. 1, 2013, for "PROGRAMMABLE STREAM PREFETCH WITH RESOURCE OPTIMIZATION"; U.S. patent application Ser. No. 13/004,005, filed Jan. 10, 2011, now U.S. Pat. No. 8,788,879, issued Jul. 22, 2014, for "FLASH MEMORY FOR CHECKPOINT STORAGE"; U.S. patent application Ser. No. 12/731,796, filed Mar. 25, 2010, now U.S. Pat. No. 8,359,367, issued Jan. 22, 2013, for "NETWORK SUPPORT FOR SYSTEM INITIATED CHECKPOINTS"; U.S. patent application Ser. No. 12/696,746, filed Jan. 29, 2010, now U.S. Pat. No. 8,327,077, issued Dec. 4, 2012, for "TWO DIFFERENT PREFETCH COMPLEMENTARY ENGINES OPERATING SIMULTANEOUSLY"; U.S. patent application Ser. No. 12/697,015, filed Jan. 29, 2010, now U.S. Pat. No. 8,364,844, issued Jan. 29, 2013, for "DEADLOCK-FREE CLASS ROUTES FOR COLLECTIVE COMMUNICATIONS EMBEDDED IN A MULTI-DIMENSIONAL TORUS NETWORK"; U.S.

patent application Ser. No. 12/727,967, filed Mar. 14, 2010, now U.S. Pat. No. 8,549,363, issued Oct. 1, 2013, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, now U.S. Pat. No. 8,571,847, issued Oct. 29, 2013, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, filed Jan. 29, 2010, now U.S. Pat. No. 8,782,164, issued Jul. 15, 2014, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "MULTIFUNCTIONING CACHE"; U.S. patent application Ser. No. 12/684,287, filed Jan. 8, 2010, now U.S. Pat. No. 8,370,551, issued Feb. 5, 2013 for ARBITRATION IN CROSSBAR FOR LOW LATENCY; U.S. patent application Ser. No. 12/684,630, filed Jan. 8, 2010, now U.S. Pat. No. 8,312,193, issued Nov. 13, 2012 for EAGER PROTOCOL ON A CACHE PIPELINE DATAFLOW; U.S. patent application Ser. No. 12/723,277, filed Mar. 12, 2010, now U.S. Pat. No. 8,521,990, issued Aug. 27, 2013 for EMBEDDED GLOBAL BARRIER AND COLLECTIVE IN A TORUS NETWORK; U.S. patent application Ser. No. 12/696,764, filed Jan. 29, 2010, now U.S. Pat. No. 8,412,974, issued Apr. 2, 2013 for GLOBAL SYNCHRONIZATION OF PARALLEL PROCESSORS USING CLOCK PULSE WIDTH MODULATION; U.S. patent application Ser. No. 12/796,411, filed Jun. 8, 2010, now U.S. Pat. No. 8,832,403, issued Sep. 9, 2014 for IMPLEMENTATION OF MSYNC; U.S. patent application Ser. No. 12/796,389, filed Jun. 8, 2010 for NON-STANDARD FLAVORS OF MSYNC; U.S. patent application Ser. No. 12/696,817, filed Jan. 29, 2010, now U.S. Pat. No. 8,713,294, issued Apr. 29, 2014 for HEAP/STACK GUARD PAGES USING A WAKEUP UNIT; U.S. patent application Ser. No. 12/697,164, filed Jan. 29, 2010, now U.S. Pat. No. 8,527,740, issued Sep. 3, 2013 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010, now U.S. Pat. No. 8,595,554, issued Nov. 26, 2013 for REPRODUCIBILITY IN BGQ.

GOVERNMENT CONTRACT

This invention was Government supported under Contract No. B554331 awarded by Department of Energy. The Government has certain rights in this invention.

BACKGROUND OF THE INVENTION

1. Field of the Invention

This invention generally relates to parallel computing systems, and more specifically, to embedding global barrier and collective networks in a torus network.

2. Background Art

Massively parallel computing structures (also referred to as "ultra-scale or "supercomputers") interconnect large numbers of compute nodes, generally, in the form of very regular structures, such as mesh, lattices, or torus configurations. The conventional approach for the most cost/effective ultrascalable computers has been to use processors configured in uni-processors or symmetric multiprocessor (SMP) configurations, wherein the SMPs are interconnected with a network to support message passing communications. Today, these supercomputing machines exhibit computing performance achieving over one peraflops.

One family of such massively parallel computers has been developed by the International Business Machines Corporation (IBM) under the name Blue Gene. Two members of this family are the Blue Gene/L system and the Blue Gene/P system. The Blue Gene/L system is a scalable system having over 65,000 compute nodes. Each node is comprised of a single application specific integrated circuit (ASIC) with two CPUs and memory. The full computer system is housed in sixty-four racks or cabinets with thirty-two node boards, or a thousand nodes, in each rack.

The Blue Gene/L computer system structure can be described as a compute node core with an I/O node surface, where communication to the compute nodes is handled by the I/O nodes. In the compute node core, the compute nodes are arranged into both a logical tree structure and a multi-dimensional torus network. The logical tree network connects the compute nodes in a tree structure so that each node communicates with a parent and one or two children. The torus network logically connects the compute nodes in a three-dimensional lattice like structure that allows each compute node to directly connect with its closest 6 neighbors in a section of the computer.

In massively parallel computing structures, multiple network paradigms are implemented to interconnect nodes for use individually or simultaneously and include three high-speed networks for parallel algorithm message passing. Additional networks are provided for external connectivity used for Input/Output, System Management and Configuration, and Debug and Monitoring services for the supercomputer nodes. The high-speed networks preferably include n-dimensional Torus, Global Tree, and Global Signal configurations. The use of each of these networks may switch back and forth based on algorithmic needs or phases of algorithms. For example, parts of calculations may be performed on the Torus, or part on the global Tree which facilitates the development of new parallel algorithms that simultaneously employ multiple networks in novel ways.

With respect to the Global Tree network, one primary functionality is to support global broadcast (down-tree) and global reduce (up-tree) operations. Additional functionality is provided to support programmable point-to-point or sub-tree messaging used for input/output, program load, system management, parallel job monitoring and debug. This functionality enables "service" or input/output nodes to be isolated from the Torus so as not to interfere with parallel computation. That is, all nodes in the Torus may operate at the full computational rate, while service nodes off-load asynchronous external interactions. This ensures scalability and repeatability of the parallel computation since all nodes performing the computation operate at the full and consistent rate. Preferably, the global tree supports the execution of those mathematical functions implementing reduction messaging operations. Preferably, the Global Tree network additionally supports multiple independent virtual channels, allowing multiple independent global operations to proceed simultaneously. The design is configurable and the ratio of computation nodes to service nodes is flexible depending on requirements of the parallel calculations. Alternate packaging strategies allow any ratio, including a machine comprised of all service or input/output nodes, as would be ideal for extremely data-intensive computations.

A third network includes a Global Signal Network that supports communications of multiple asynchronous 'signals' to provide global logical "AND" or "OR" functionality. This functionality is specifically provided to support global barrier operations ("AND"), for indicating to all nodes that, for example, all nodes in the partition have arrived at a specific point in the computation or phase of the parallel algorithm, and, global notification ("OR") functionality, for indicating to all nodes that, for example, one or any node in the partition has arrived at a particular state or condition. Use of this network type enables technology for novel parallel algorithms, coordination, and system management.

On previous generation BlueGene/L (BG/L) and BlueGene/P (BG/P) supercomputers, besides the high speed 3-dimension torus network, there are also dedicated collective and global barrier networks. They have the advantage of independence among different networks, but also have a significant drawback in terms of (1) extra high speed pins on chip, resulting in extra packaging cost, and (2) harder to design applicable partitioning in packaging because the 3 networks have a different topology.

BRIEF SUMMARY

Embodiments of the invention provide a method, system and computer program product for embedding a global barrier and global interrupt network in a parallel computer system organized as a torus network. The computer system includes a multitude of nodes, and each of the nodes has a plurality of receivers and a plurality of senders. In one embodiment, the method comprises taking inputs from a set of the receivers, dividing the inputs from the receivers into a plurality of classes, combining the inputs of each of the classes into a logical OR to obtain a result, and sending said result to a set of the senders. In an embodiment the combining of the inputs is a logical OR operation.

In an embodiment, the sending includes sending said result to the set of the set of senders to create a global barrier among a given set of said nodes. In one embodiment, the torus network is separated into a plurality of partitions, and the sending includes sending said results to the set of senders to create a global barrier among all of the nodes within one of said partitions.

In one embodiment, the multitude of nodes includes a plurality of classes of nodes, each of said classes including compute nodes and I/O nodes, and said result is an effective logical OR of all inputs from all the compute nodes and the I/O nodes within a given one of said classes. In one embodiment, the method further comprises when one of the senders detects that a local barrier state of said one of the senders has changed to a new barrier state, said one of the senders sending said new barrier state to one of the receivers. In one embodiment, this sending said new barrier state includes using a global barrier packet to send said new barrier state. In an embodiment, said global barrier packet identifies a packet type and a barrier state.

BRIEF DESCRIPTION OF THE SEVERAL VIEWS OF THE DRAWINGS

Embodiments of the invention provide a method, system and computer program product for embedding a collective network in a parallel computer system organized as a torus network. The computer system includes a multitude of nodes, and each of the nodes has a plurality of receivers and a plurality of senders. In one embodiment, the method comprises adding to the torus network a central collective logic to route messages among at least a group of said nodes in a tree structure, wherein, at defined times, one of said group of nodes is a root node and the others of said group of nodes are leaf or intermediate nodes. The method also comprises routing messages from the leaf or intermediate nodes to the root node in an up tree direction; processing the messages being routed from the leaf or intermediate nodes to the root node to form a processed message; and sending the processed message back from the root node to at least one of the leaf or intermediate nodes.

FIG. 6 shows the format of a collective data packet.

FIG. 7 illustrates the format of a point-to-point data packet.

DETAILED DESCRIPTION

Figure 1:
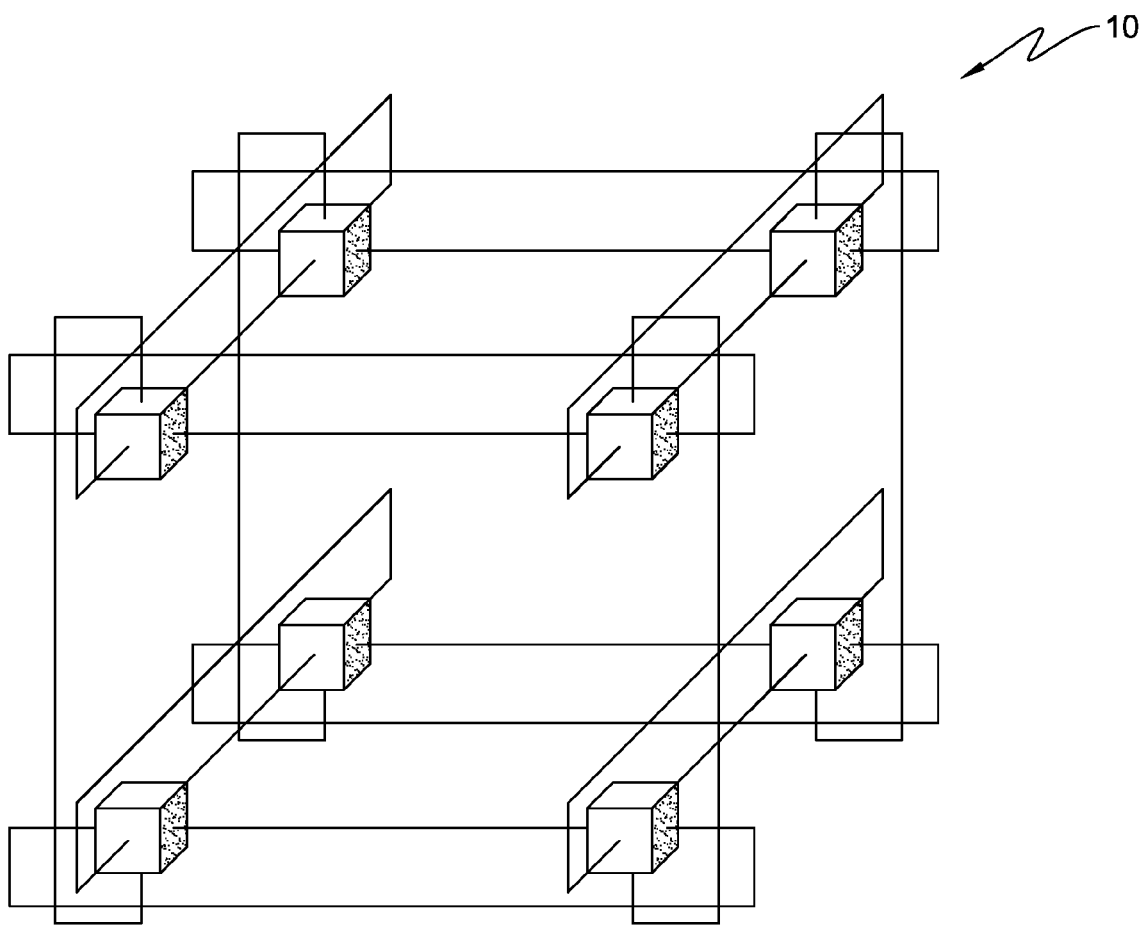
FIG. 1 depicts a unit cell of a three-dimensional torus implemented in a massively parallel supercomputer.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to embedding global barrier and collective networks in a parallel computing system organized as a torus network. The invention may be implemented, in an embodiment, in a massively parallel computer architecture, referred to as a supercomputer. As a more specific example, the invention, in an embodiment, may be implemented in a massively parallel computer developed by the International Business Machines Corporation (IBM) under the name Blue Gene/Q. The Blue Gene/Q is expandable to 512 compute racks, each with 1024 compute node ASICs (BQC) including 16 PowerPC A2 processor cores at 1600 MHz. Each A2 core has associated a quad-wide fused multiply-add SIMD floating point unit, producing 8 double precision operations per cycle, for a total of 128 floating point operations per cycle per compute chip. Cabled as a single system, the multiple racks can be partitioned into smaller systems by programming switch chips, termed the BG/Q Link ASICs (BQL), which source and terminate the optical cables between midplanes.

Each compute rack is comprised of 2 sets of 512 compute nodes. Each set is packaged around a doubled-sided backplane, or midplane, which supports a five-dimensional torus of size 4×4×4×4×2 which is the communication network for the compute nodes which are packaged on 16 node boards. This tori network can be extended in 4 dimensions through link chips on the node boards, which redrive the signals optically with an architecture limit of 64 to any torus dimension. The signaling rate is 10 Gb/s, (8/10 encoded), over ~20 meter multi-mode optical cables at 850 nm. As an example, a 96-rack system is connected as a 16×16×16×12×2 torus, with the last ×2 dimension contained wholly on the midplane. For reliability reasons, small torus dimensions of 8 or less may be run as a mesh rather than a torus with minor impact to the aggregate messaging rate.

The Blue Gene/Q platform contains four kinds of nodes: compute nodes (CN), I/O nodes (ION), login nodes (LN), and service nodes (SN). The CN and ION share the same compute ASIC.

In addition, associated with a prescribed plurality of processing nodes is a dedicated node that comprises a quad-processor with external memory, for handling of I/O communications to and from the compute nodes. Each I/O node has an operating system that can handle basic tasks and all the functions necessary for high performance real time code. The I/O nodes contain a software layer above the layer on the compute nodes for handling host communications. The choice of host will depend on the class of applications and their bandwidth and performance requirements.

In an embodiment, each compute node of the massively parallel computer architecture is connected to six neighboring nodes via six bi-directional torus links, as depicted in the three-dimensional torus sub-cube portion shown at 10 in FIG. 1. It is understood, however, that other architectures comprising more or fewer processing nodes in different torus configurations (i.e., different numbers of racks) may also be used.

The ASIC that powers the nodes is based on system-on-a-chip (s-o-c) technology and incorporates all of the functionality needed by the system. The nodes themselves are physically small allowing for a very high density of processing and optimizing cost/performance.

Figure 2:
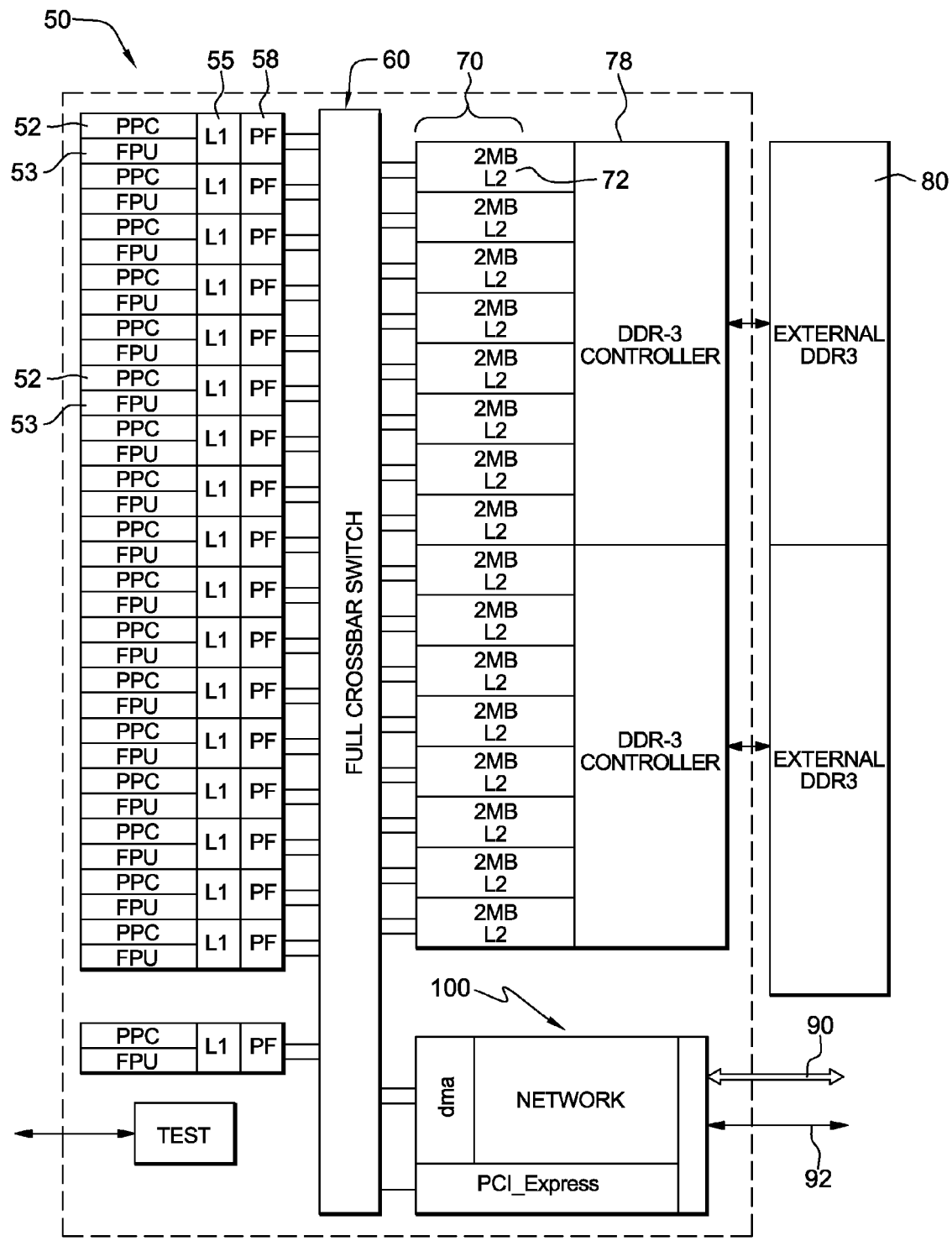
FIG. 2 is a block diagram of a node of the supercomputer.

Referring now to FIG. 2, there is shown the overall architecture of the multiprocessor computing node 50 implemented in a parallel computing system in which the present invention is implemented. In one embodiment, the multiprocessor system implements the proven Blue Gene® architecture, and is implemented in a BlueGene/Q massively parallel computing system comprising, for example, 1024 compute node ASICs (BQC), each including multiple processor cores.

A compute node of this present massively parallel supercomputer architecture and in which the present invention may be employed is illustrated in FIG. 2. The compute node 50 is a single chip ("nodechip") based on low power A2 PowerPC cores, though the architecture can use any processor cores, and may comprise one or more semiconductor chips. In the embodiment depicted, the node includes 16 PowerPC A2 at 1600 MHz, in cores in one embodiment.

More particularly, the basic nodechip 50 of the massively parallel supercomputer architecture illustrated in FIG. 2 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 on each core (204.8 GF peak node). In one implementation, the core operating frequency target is 1.6 GHz providing, for example, a 563 GB/s aggregated memory bandwidth to shared L2 cache 70 via a full crossbar switch 60. In one embodiment, there is provided 32 MB of shared L2 cache 70, each core having associated 2 MB of L2 cache 72. There is further provided external DDR SDRAM (e.g., Double Data Rate synchronous dynamic random access) memory 80, as a lower level in the memory hierarchy in communication with the L2. In one embodiment, the node includes 42.6 GB/s DDR3 bandwidth (1.333 GHz DDR3) (2 channels each with chip kill protection).

Each FPU 53 associated with a core 52 has a 32B wide data path to the L1-cache 55 of the A2, allowing it to load or store 32B per cycle from or into the L1-cache 55. Each core 52 is directly connected to a private prefetch unit (level-1 prefetch, L1P) 58, which accepts, decodes and dispatches all requests sent out by the A2. The load interface from the A2 core 52 to the L1P 55 is 32B wide and the store interface is 16B wide, both operating at processor frequency. The L1P 55 implements a fully associative, 32 entry prefetch buffer. Each entry can hold an L2 line of 128B size. The L1P provides two prefetching schemes for the private prefetch unit 58: a sequential prefetcher as used in previous BlueGene architecture generations, as well as a list prefetcher.

As shown in FIG. 2, the 32 MiB shared L2 is sliced into 16 units, each connecting to a slave port of the switch 60. Every physical address is mapped to one slice using a selection of programmable address bits or a XOR-based hash across all address bits. The L2-cache slices, the L1Ps and the L1-D caches of the A2s are hardware-coherent. A group of 8 slices is connected via a ring to one of the two DDR3 SDRAM controllers 78.

An embodiment of the invention implements a direct memory access engine referred to herein as a Messaging Unit, "MU" such as MU 100, with each MU including 3 XBAR master interfaces, 1 XBAR slave interface, a number of DMA engines for processing packets and interfaces to the Network logic unit. In one embodiment, the compute node further includes, in a non-limiting example: 10 intra-rack interprocessor links 90, each at 2.0 GB/s, for example, i.e., 10*2 GB/s intra-rack & inter-rack (e.g., configurable as a 5-D torus in one embodiment); and, one I/O link 92 interfaced with the MU at 2.0 GB/s (2 GB/s I/O link (to I/O subsystem)) is additionally provided. The system node employs or is associated and interfaced with a 8-16 GB memory/node.

Although not shown, each A2 core has associated a quad-wide fused multiply-add SIMD floating point unit, producing 8 double precision operations per cycle, for a total of 128 floating point operations per cycle per compute chip. A2 is a 4-way multi-threaded 64b PowerPC implementation. Each A2 core has its own execution unit (XU), instruction unit (IU), and quad floating point unit (QPU) connected via the AXU (Auxiliary eXecution Unit) (FIG. 2). The QPU is an implementation of the 4-way SIMD QPX floating point instruction set architecture. QPX is an extension of the scalar PowerPC floating point architecture. It defines 32 32B-wide floating point registers per thread instead of the traditional 32 scalar 8B-wide floating point registers.

The BG/Q network is a 5-dimensional (5-D) torus for the compute nodes. In a compute chip, besides the 10 bidirectional links to support the 5-D torus, there is also a dedicated I/O link running at the same speed as the 10 torus links that can be connected to an I/O node.

The BG/Q torus network originally supports 3 kind of packet types: (1) point-to-point DATA packets from 32 bytes to 544 bytes, including a 32 byte header and a 0 to 512 bytes payload in multiples of 32 bytes, as shown in FIG. 7; (2) 12 byte TOKEN_ACK (token and acknowledgement) packets, not shown; (3) 12 byte ACK_ONLY (acknowledgement only) packets, not shown.

Figure 3:
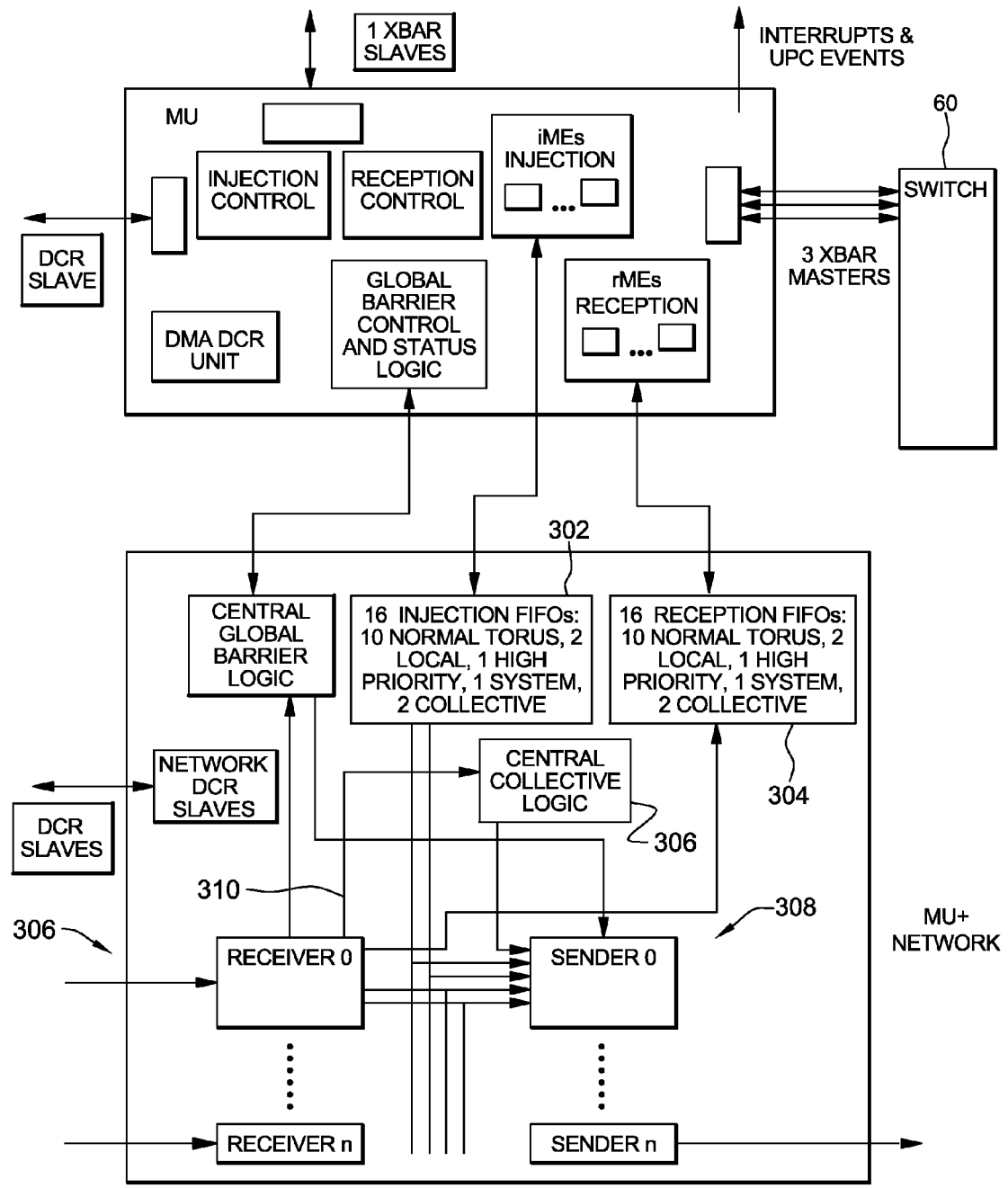
FIG. 3 is a block diagram showing a messaging unit and associated network logic that may be used in an embodiment of the invention.

FIG. 3 shows the messaging unit and the network logic block diagrams that may be used on a computer node in one embodiment of the invention. The torus network is comprised of (1) Injection fifos 302, (2) reception fifos 304, (3) receivers 306, and (4) senders 308. The injection fifos include: 10 normal fifos, 2 KB buffer space each; 2 loopback fifos, 2 KB each; 1 high priority and 1 system fifo, 4 KB each. The Reception fifos include: 10 normal fifos tied to individual receiver, 2 KB each; 2 loopback fifos, 2 kB each; 1 high priority and 1 system fifo, 4 KB each. Also, in one embodiment, the torus network includes eleven receivers 306 and eleven senders 308.

Figure 4:
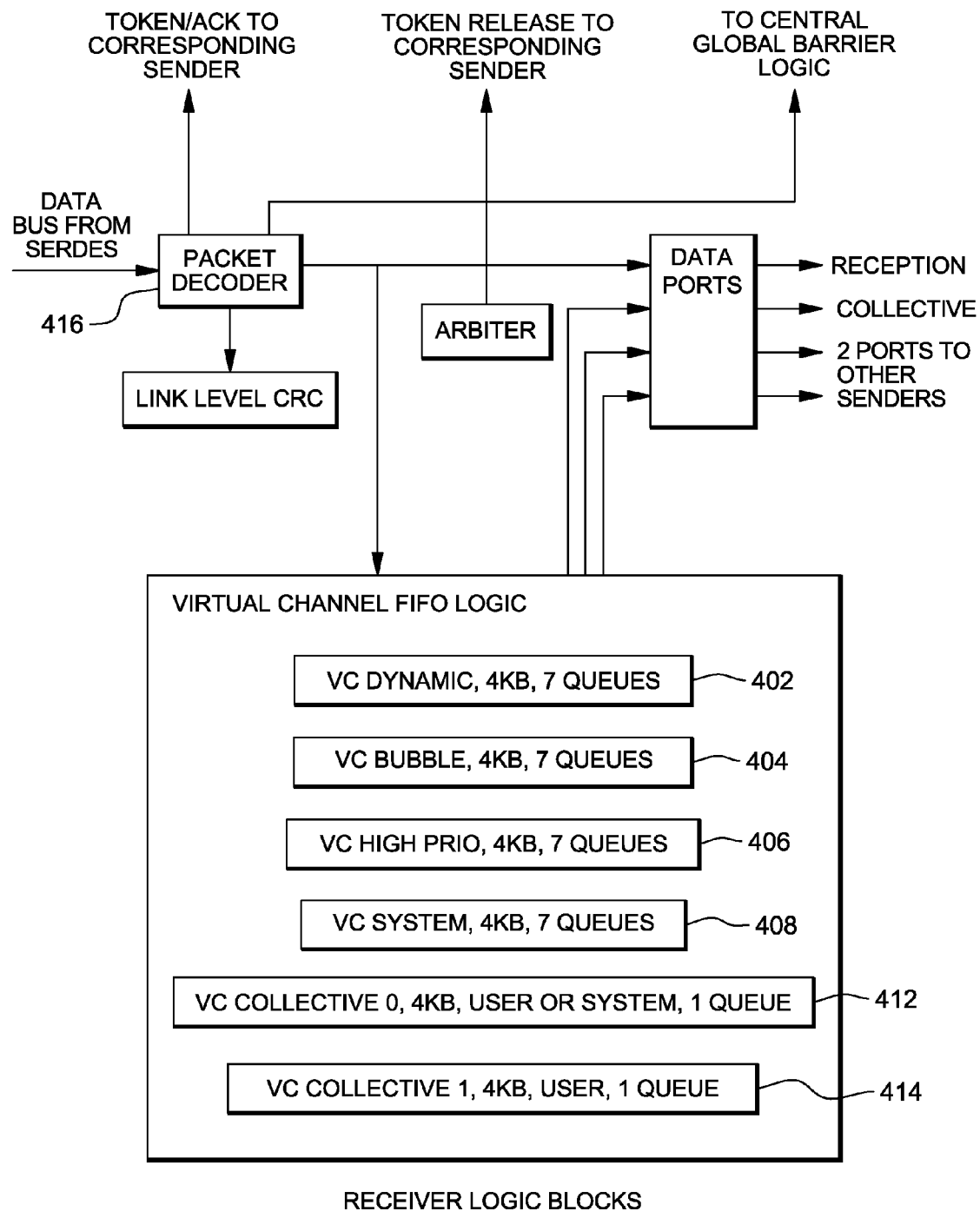
FIG. 4 is a logic block diagram of one of the receivers shown in FIG. 3.

The receiver logic diagram is shown in FIG. 4. Each receiver has four virtual channels (VC) with 4 KB of buffers: one dynamic VC 402, one deterministic VC 404, one high priority VC 406, and one system VC 408.

Figure 5:
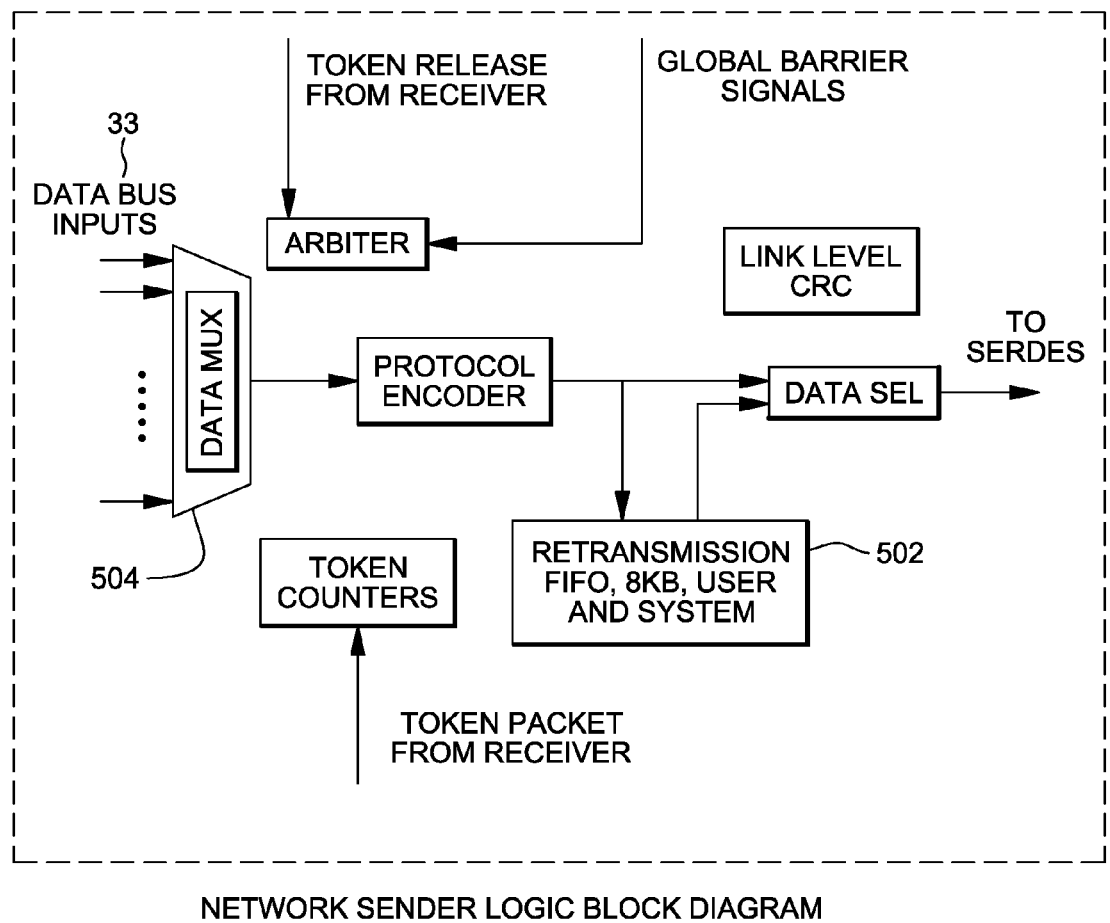
FIG. 5 is a logic block diagram of one of the senders shown in FIG. 3.

The sender logic block diagram is shown in FIG. 5. Each sender has an 8 KB retransmission fifo 502. The DATA and TOKEN_ACK packets carry link level sequence number and are stored in the retransmission fifo. Both of these packets will get acknowledgement back via either TOKEN_ACK or ACK_ONLY packets on the reverse link when they are successfully transmitted over electrical or optical cables. If there is a link error, then the acknowledgement will not be received and a timeout mechanism will lead to re-transmissions of these packets until they are successfully received by the receiver on the other end. The ACK_ONLY packets do not carry a sequence number and are sent over each link periodically.

To embed a collective network over the 5-D torus, a new collective DATA packet type is supported by the network logic. The collective DATA packet format shown in FIG. 6 is similar in structure to the point-to-point DATA packet format shown in FIG. 7. The packet type ×"55" in byte 0 of the point-to-point DATA packet format is replaced by a new collective DATA packet type ×"5A". The point-to-point routing bits in byte 1, 2 and 3 are replaced by collective operation code, collective word length and collective class route, respectively. The collective operation code field indicates one of the supported collective operations, such as binary AND, OR, XOR, unsigned integer ADD, MIN, MAX, signed integer ADD, MIN, MAX, as well as floating point ADD, MIN and MAX.

The collective word length indicates the operand size in units of $2^n*4$ bytes for signed and unsigned integer operations, while the floating point operand size is fixed to 8 byte (64 bit double precision floating point numbers). The collective class route identifies one of 16 class routes that are supported on the BG/Q machine. On a single node, the 16 classes are defined in Device Control Ring (DCR) control registers. Each class has 12 input bits identifying input ports, for the 11 receivers as well as the local input; and 12 output bits identifying output ports, for the 11 senders as well as the local output. In addition, each class definition also has 2 bits indicating whether the particular class is used as user Comm_World (e.g., all compute nodes in this class), user sub-communicators (e.g, a subset of compute nodes), or system Comm_World (e.g., all compute nodes, possibly with I/O nodes serving the compute partition also).

Figure 13:
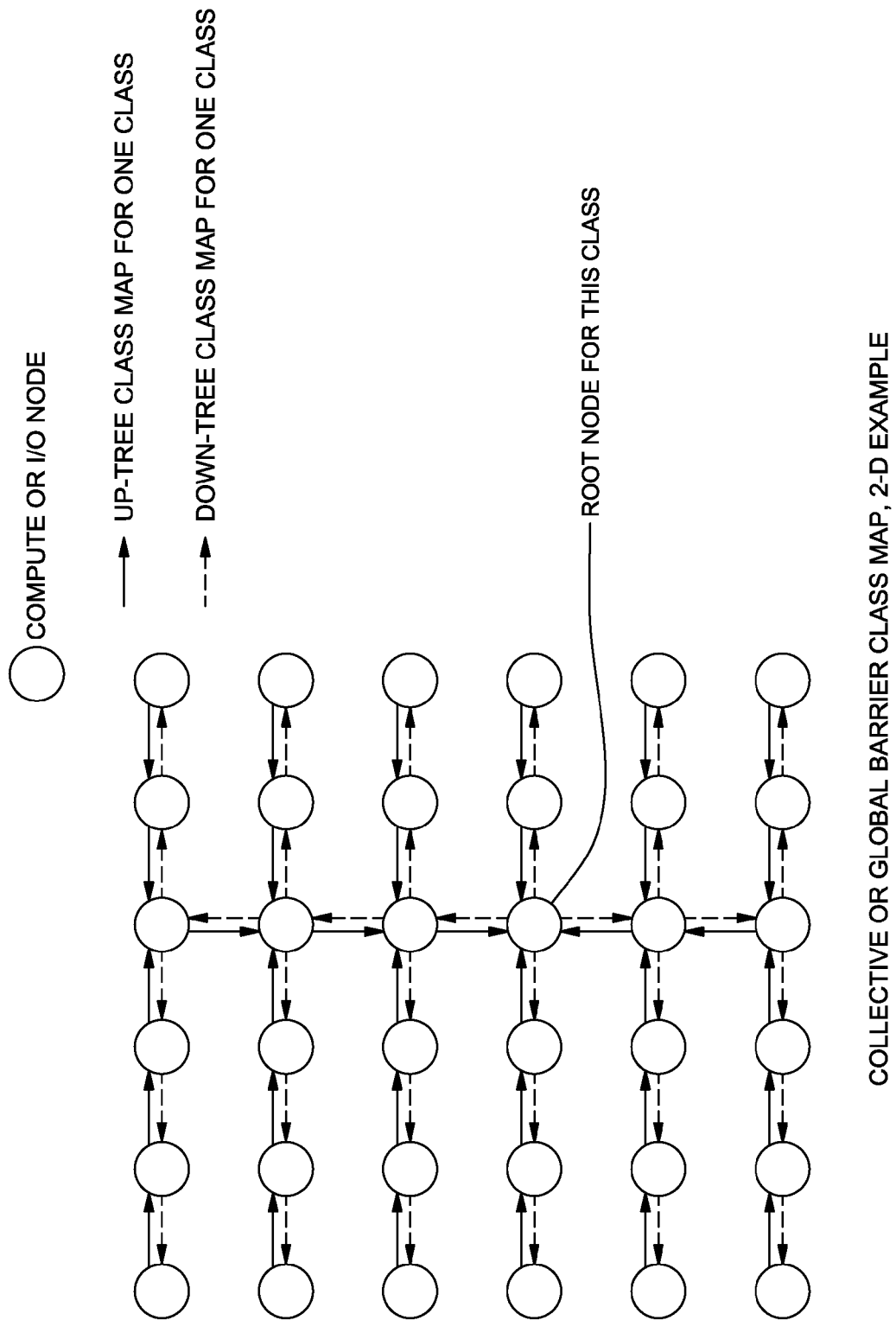
FIG. 13 shows an example of a collective network embedded in a 2-D torus network.

The algorithm for setting up dead-lock free collective classes is described in co-pending patent application YOR920090598US1. An example of a collective network embedded in a 2-D torus network is shown in FIG. 13. Inputs from all nodes are combined along with the up-tree path, and end up on the root node. The result is then turned around at the root node and broadcasted down the virtual tree back to all contributing nodes.

In byte 3 of the collective DATA packet header, bit 3 to bit 4 defines a collective operation type which can be (1) broadcast, (2) all reduce or (3) reduce. Broadcast means one node broadcasts a message to all the nodes, there is no combining of data. In an all-reduce operation, each contributing nodes in a class contributes a message of the same length, the input message data in the data packet payload from all contributing nodes are combined according to the collective OP code, and the combined result is broadcasted back to all contributing nodes. The reduce operation is similar to all-reduce, but in a reduce operation, the combined result is received only by the target node, all other nodes will discard the broadcast they receive.

In the Blue Gene/Q compute chip (BQC) network logic, two additional collective injection fifos (one user+one system) and two collective reception fifos (one user+one system) are added for the collective network, as shown in FIG. 3 at 302 and 304. A central collective logic block 306 is also added. In each of the receivers, two collective virtual channels are added, as shown in FIG. 4 at 412 and 414. Each receiver also has an extra collective data bus 310 output to the central collective logic, as well as collective requests and grants (not shown) for arbitration. In the sender logic, illustrated in FIG. 5, the number of input data buses to the data mux 504 is expanded by one extra data bus coming from the central collective logic block 306. The central collective logic will select either the up tree or the down tree data path for each sender depending on the collective class map of the data packet. Additional request and grant signals from the central collective logic block 306 to each sender are not shown.

Figure 8:
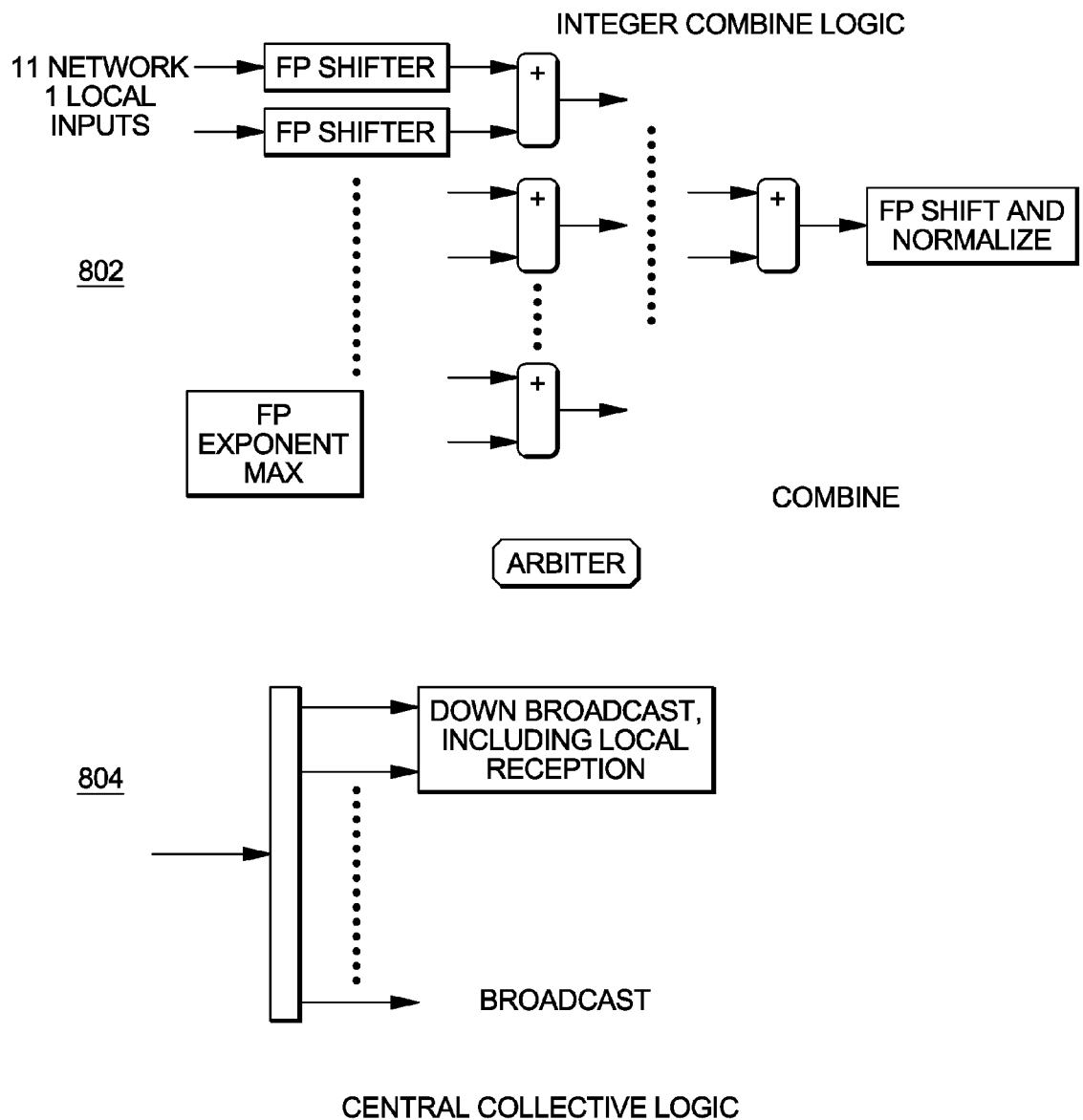
FIG. 8 is a diagram of the central collective logic block of FIG. 3.

A diagram of the central collective logic block 306 is shown in FIG. 8. In an embodiment, there are two separate data paths 802 and 804, Path 802 is for uptree combine, and patent 804 for downtree broadcast. This allows full bandwidth collective operations without uptree and downtree intereference. The sender arbitration logic is, in an embodiment, modified to support the collective requests. The uptree combining operation for floating point number is further illustrated in co-pending patent application YOR920090578US1.

When the torus network is routing point-to-point packets, priority is given to system packets. For example, when both user and system requests (either from receivers or from injection fifos) are presented to a sender, the network will give grant to one of the system requests. However, when the collective network is embedded into the torus network, there is a possiblity of livelock because at each node, both system and user collective operations share up-tree and down-tree logic path, and each collective operation involve more than one node. For example, a continued stream of system packets going over a sender could block a down-tree user collective on the same node from progressing. This down-tree user collective class may include other nodes that happen to belong to another system collective class. Because the user down-tree collective already occupies the down-tree collective logic on those other nodes, the system collective on the same nodes then can not make progress. To avoid the potential livelock between the collective network traffic and the regular torus network traffic, the arbitration logic in both the central collective logic and the senders are modified.

Figure 9:
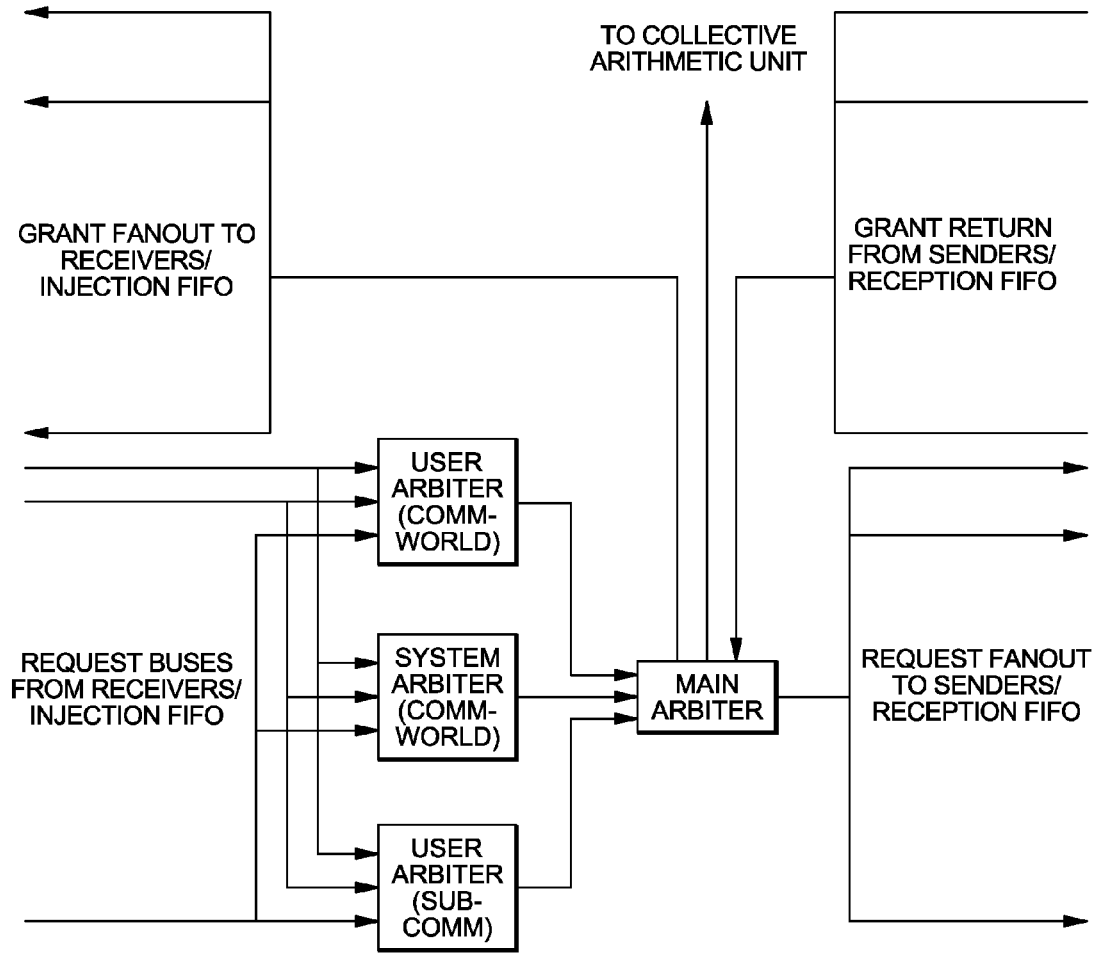
FIG. 9 depicts an arbitration process that may be used in an embodiment of the invention.

In the central collective arbiter, shown in FIG. 9, the following arbitration priorities are implemented,
  (1) down tree system collective, highest priority,
  (2) down tree user collective, second priority,
  (3) up tree system collective, third priority,
  (4) up tree user collective, lowest priority.

In addition, the down-tree arbitration logic in the central collective block also implements a DCR programmable timeout, where if the request to a given sender does not make progress for a certain time, all requests to different senders and/or local reception fifo involved in the broadcast are cancelled and a new request/grant arbitration cycle will follow.

In the network sender, the arbitration logic priority is further modified as follows, in order of descending priority;
  (1) round-robin between regular torus point-to-point system and collective; when collective is selected, priority is given to down tree requests;
  (2) Regular torus point-to-point high priority VC;
  (3) Regular torus point-to-point normal VCs (dynamic and deterministic).

On BlueGene/L and BlueGene/P, the global barrier network is a separate and independent network. The same network can be used for (1) global AND (global barrier) operations, or (2) global OR (global notification or global interrupt) operations. For each programmable global barrier bit on each local node, a global wired logical "OR" of all input bits from all nodes in a partition is implemented in hardware. The global AND operation is achieved by first "arming" the wire, in which case all nodes will program its own bit to '1'. After each node participating in the global AND (global barrier) operation has done "arming" its bit, a node then lowers its bit to '0' when the global barrier function is called. The global barrier bit will stay at '1' until all nodes have lowered their bits, therefore achieving a logical global AND operation. After a global barrier, the bit then needs to be re-armed. On the other hand, to do a global OR (for global notification or global interrupt operation), each node would initially lower its bit, then any one node could raise a global attention by programming its own bit to '1'.

Figure 10:
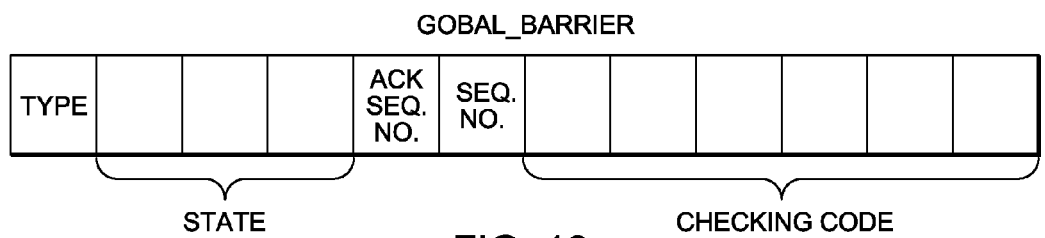
FIG. 10 illustrates a GLOBAL_BARRIER PACKET type in accordance with an embodiment of the invention.

To embed the global barrier and global interrupt network over the existing torus network, in one embodiment, a new GLOBAL_BARRIER packet type is used. This packet type, an example of which is shown in FIG. 10 at 1000, is also 12 bytes, including: 1 byte type, 3 byte barrier state, 1 byte acknowledged sequence number, 1 byte packet sequence number, 6 byte Reed-Solomon checking code. This packet is similar to the TOKEN_ACK packet and is also stored in the retransmission fifo and covered by an additional link-level CRC.

Figure 11:
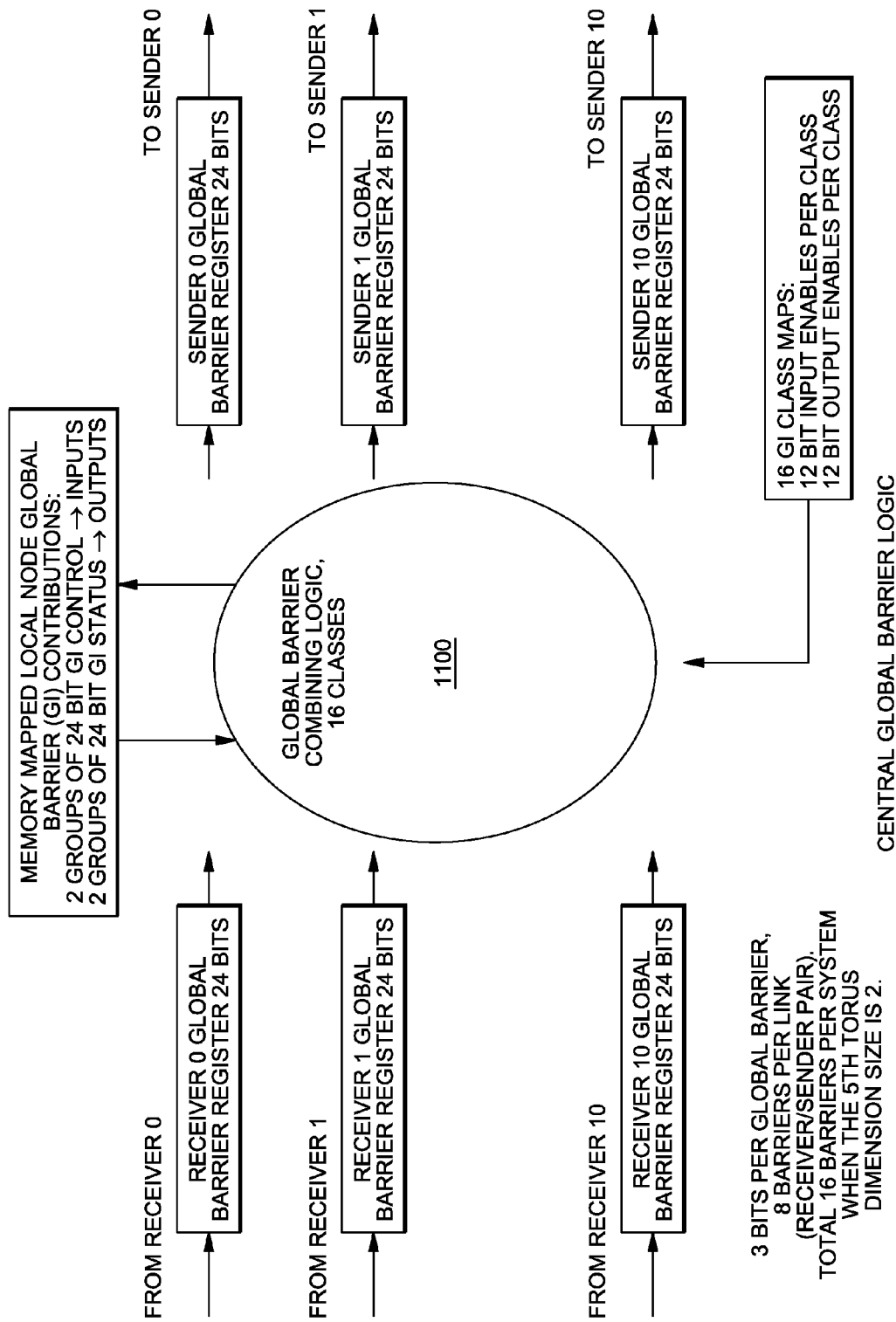
FIG. 11 shows global collective logic that is used in one embodiment of the invention.

The logic addition includes each receiver's packet decoder (shown at 416 in FIG. 4) decoding the GLOBAL_BARRIER packets, and sends the barrier state to the central global barrier logic, shown in FIG. 11, The central collective logic 1100 takes each receiver's input 24 bits, as well as memory mapped local node contribution, and then splits all inputs into 16 classes, with 3 bits per contributor per class. The class map definition are similar to those in the collectives, i.e, each class has 12 input enable bits, and 12 output enable bits. When all 12 output enable bits are zero, this indicates the current node is the root of the class, and the input enable bits are used as the output enable bits. Every bit of the 3 bits of the class of the 12 inputs are ANDed with the input enable, and the result bits are ORed together into a single 3 bit state for this particular class. The resulting 3 bits of the current class then gets replicated 12 times, 3 bits each for each output link. Each output link's 3 bits are then ANDed with the output enable bit, and the resulting 3 bits are then given to the corresponding sender or to the local barrier state.

Each class map (collective or global barrier) has 12 input bits and 12 output bits. When the bit is high or set to '1', the corresponding port is enabled. A typical class map will have multiple inputs bits set, but only one output bit set, indicating the up tree link. On the root node of a class, all output bits are set to zero, and the logic recognizes this and uses the input bits for outputs. Both collective and global barrier have separated up-tree logic and down-tree logic. When a class map is defined, except for the root node, all nodes will combine all enabled inputs and send to the one output port in an up-tree combine, then take the one up-tree port (defined by the output class bits) as the input of the down-tree broadcast, and broadcast the results to all other senders/local reception defined by the input class bits, i.e., the class map is defined for up-tree operation, and in the down-tree logic, the actual input and output ports (receivers and senders) are reversed. At the root of the tree, all output class bits are set to zero, the logic combines data (packet data for collective, global barrier state for global barrier) from all enabled input ports (receivers), reduces the combined logic to a single result, and then broadcast the result back to all the enabled outputs (senders) using the same input class bits, i.e., the result is turned around and broadcast back to all the input links.

Figure 12:
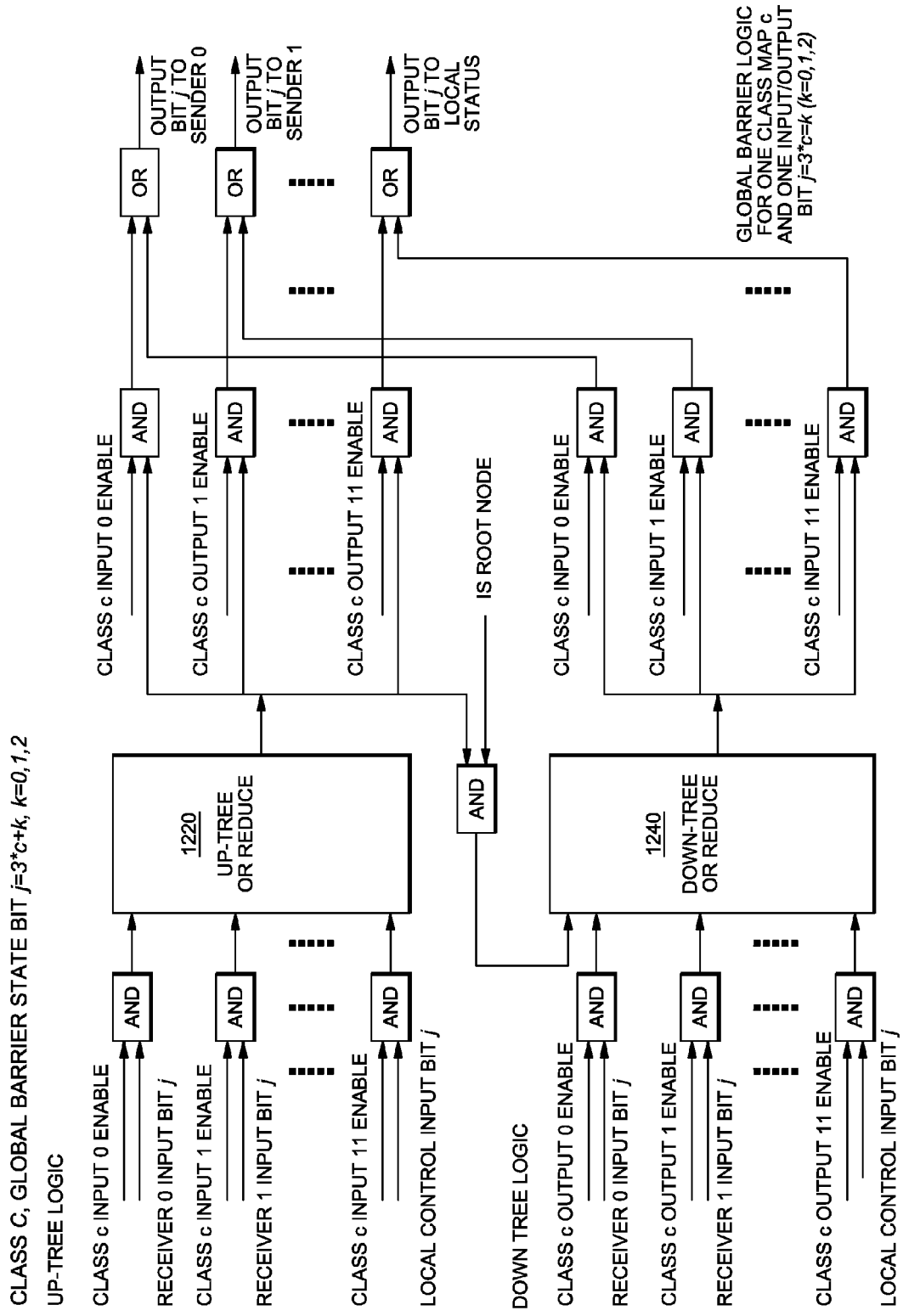
FIG. 12 illustrates global barrier logic that may be used in an embodiment of the invention.

FIG. 12 shows the detailed implementation of the up-tree and down-tree global barrier combining logic inside block 1100 (FIG. 11). The drawing is shown for one global barrier class c and one global barrier state bit $j=3*c+k$, where $k=0, 1, 2$. This logic is then replicated multiple times for each class c, and for every input bit k. In the up-tree path, each input bit (from receivers and local input global barrier control registers) is ANDed with up-tree input class enables for the corresponding input, the resulting bits is then OR reduced (1220, via a tree of OR gates or logically equivalent gates) into a single bit. This bit is then fanned out and ANDed with up-tree output class enables to form up_tree_output_state(i, j), where i is the output port number. Similarly, each input bit is also fanned out into the down-tree logic, but with the input and output class enables switched, i.e., down-tree input bits are enabled by up-tree output class map enables, and down-tree output bits down_tree_output_state(i,j) are enabled by up-tree input class map enables. On a normal node, a number of up-tree input enable bits are set to '1', while only one up-tree output class bit is set to '1'. On the root node of the global barrier tree, all output class map bits are set to '0', the up-tree state bit is then fed back directly to the down tree OR reduce logic 1240. Finally, the up-tree and down-tree state bits are ORed together for each sender and the local global barrier status:

Sender(i) global barrier state(j)=up_tree_output_state(i,j) OR down_tree_output_state(i,j);

LOCAL global barrier status(j)=up_tree_output_state (i=last,j) OR down_tree_output_state(i=last,j);

On BlueGene/L and BlueGene/P, each global barrier is implemented by a single wire per node, the effective global barrier logic is a global OR of all input signals from all nodes. Because there is a physical limit of the largest machine, there is an upper bound for the signal propagation time, i.e., the round trip latency of a barrier from the furthest node going up-tree to the root that received the down-tree signal at the end of a barrier tree is limited, typically within about one microsecond. Thus a simple timer tick is implemented for each barrier, one will not enter the next barrier until a preprogrammed time has passed. This allows each signal wire on a node to be used as an independent barrier. However, on Blue-Gene/Q, when the global barrier is embedded in the torus network, because of the possibility of link errors on the high speed links, and the associated retransmission of packets in the presence of link errors, it is, in an embodiment, impossible to come up with a reliable timeout without making the barriers latency unnecessarily long. Therefore, one has to use multiple bits for a single barrier. In fact, each global barrier will require 3 status bits, the 3 byte barrier state in Blue Gene/Q therefore supports 8 barriers per physical link.

To initialize a barrier of a global barrier class, all nodes will first program its 3 bit barrier control registers to "100", and it then waits for its own barrier state to become "100", after which a different global barrier is called to insure all contributing nodes in this barrier class have reached the same initialized state. This global barrier can be either a control system software barrier when the first global barrier is being set up, or an existing global barrier in a different class that has already been initialized. Once the barrier of a class is set up, the software then can go through the following steps without any other barrier classes being involved. (1) From "100", the local global barrier control for this class is set to "010", and when the first bit of the 3 status bits reaches 0, the global barrier for this class is achieved. Because of the nature of the global OR operations, the 2nd bit of the global barrier status bit will reach '1' either before or at the same time as the first bit going to '0', i.e., when the $1^{st}$ bit is '0', the global barrier status bits will be "010", but it might have gone through an intermediate "110" state first. (2) For the second barrier, the global barrier control for this class is set from "010" to "001", i.e., lower the second bit and raise the 3rd bit, and wait for the $2^{nd}$ bit of status to change from '1' to '0'. (3) Similarly, the third barrier is done by setting the control state from "001" to "100", and then waiting for the third bit to go low. After the $3^{rd}$ barrier, the whole sequence repeats.

An embedded global barrier requires 3 bits, but if configured as a global interrupt (global notification), then each of the 3 bit can be used separately, but every 3 notification bits share the same class map.

While the BG/Q network design supports all 5 dimensions labeled A, B, C, D, E symmetrically, in practice, the fifth E dimension, in one embodiment, is kept at 2 for BG/Q. This allows the doubling of the number of barriers by keeping one group of 8 barriers in the E=0 4-D torus plane, and the other group of 8 barriers in the E=1 plane. The barrier network processor memory interface therefore supports 16 barriers. Each node can set a 48 bit global barrier control register, and read another 48 bit barrier state register. There is a total of 16 class maps that can be programmed, one for each of 16 barriers. Each receiver carries a 24 bit barrier state, so does each sender. The central barrier logic takes all receiver inputs plus local contribution, divides them into 16 classes, then combines them into an OR of all inputs in each class, and the result is then sent to the torus senders. Whenever a sender detects that its local barrier state has changed the sender sends the new barrier state to the next receiver using the GLOBAL_BARRIER packet. This results in an effective OR of all inputs from all compute and I/O nodes within a given class map. Global barrier class maps can also go over the I/O link to create a global barrier among all compute nodes within a partition.

The above feature of doubling the class map is also used by the embedded collective logic. Normally, to support three collective types, i.e., user Comm_World, user sub_comm, and system, three virtual channels would be needed in each receiver. However, because the fifth dimension is a by 2 dimension on BG/Q, user COMM_WORLD can be mapped to one 4-D plane (e=0) and the system can be mapped to another 4-D plane (e=1). Because there are no physical links being shared, the user COMM_WORLD and system can share a virtual channel in the receiver, shown in FIG. 7 as collective VC 0, reducing buffers being used.

In one embodiment of the invention, because the $5^{th}$ dimension is 2, the class map is doubled from 8 to 16. For global barriers, class 0 and 8 will use the same receiver input bits, but different groups of the local inputs (48 bit local input is divided into 2 groups of 24 bits). Class i (0 to 7) and class i+8 (8 to 15) can not share any physical links, these class configuration control bits are under system control. With this doubling, each logic block in FIG. 12 is additionally replicated one more time, with the sender output in FIG. 12 further modified Sender(i) global barrier state(j)=up_tree_output_state_group0(i,j) OR down_tree_output_state_group0(i,j) OR up_tree_output_state_group1(i,j) OR down_tree_output_state_group1(i,j);

The local state has separate wires for each group (48 bit state, 2 groups of 24 bits) and is unchanged.

The 48 global barrier status bits also feed into an interrupt control block. Each of the 48 bits can be separately enabled or masked off for generating interrupts to the processors. When one bit in a 3 bit class is configured as a global interrupt, the corresponding global barrier control bit is first initialized to zero on all nodes, then the interrupt control block is programmed to enable interrupt when that particular global barrier status bit goes to high ('1'). After this initial setup, any one of the nodes within the class could raise the bit by writing a '1' into its global barrier control register at the specific bit position. Because the global barrier logic functions as a global OR of the control signal on all nodes, the '1' will be propagated to all nodes in the same class, and trigger a global interrupt on all nodes. Optionally, one can also mask off the global interrupt and have a processor poll the global interrupt status instead.

On BlueGene/Q, while the global barrier and global interrupt network is implemented as a global OR of all global barrier state bits from all nodes (logic 1220 and 1240), it provides both global AND and global OR operations. Global AND is achieved by utilizing a '1' to '0' transition on a specific global barrier state bit, and global OR is achieved by utilizing a '0' to '1' transition. In practice, one can also implement the logic block 1220 and 1240 as AND reduces, where then global AND are achieved with '0' to '1' state transition and global OR with '1' to '0' transition. Any logically equivalent implementations to achieve the same global AND and global OR operations should be covered by this invention.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

What is claimed is:

1. A method of embedding a collective network in a parallel computer system organized as a torus network, said computer system including a multitude of nodes, each of the nodes having a plurality of receivers and a plurality of senders, the method comprising:
adding to the torus network a central collective logic to route messages among at least a group of said nodes in a tree structure, wherein, at defined times, one of said group of nodes is a root node and the others of said group of nodes are leaf or intermediate nodes, and including said central collective logic forming separate up-tree and down-tree paths for routing messages among said group of nodes;
the central collective logic selecting one of the up-tree path and down-tree path for one of the messages for each sender depending on a collective class map of said one of the messages;
routing messages from the leaf or intermediate nodes to the root node in an up tree direction; processing the messages being routed from the leaf or intermediate nodes to the root node to form a processed message; and
sending the processed message back from the root node to at least one of the leaf, intermediate or root nodes.

2. The method according to claim 1, wherein said processing includes combining the messages from the leaf or intermediate nodes into one, combined message.

3. The method according to claim 1, wherein the sending includes sending the processed message from the root node to all the leaf, intermediate and root nodes in a down tree direction.

4. The method according to claim 1, wherein said adding further includes:
adding dedicated injection fifos and dedicated reception fifos for collective operations; and
adding dedicated collective virtual channels to each of the receivers, and adding a central collective logic block to handle arbitration and collective data flow.

5. The method according to claim 1, wherein one can double the number of classes when the size of a torus dimension is two.

6. A system for embedding a collective network in a parallel computer system organized as a torus network, said computer system including a multitude of nodes, each of the nodes having a plurality of receivers and a plurality of senders, the system comprising one or more processing units configured for:
providing a central collective logic to the torus network to route messages among at least a group of said nodes in a tree structure, wherein, at defined times, one of said group of nodes is a root node and the others of said group of nodes are leaf or intermediate nodes, and including said central collective logic forming separate up-tree and down-tree paths for routing messages among said group of nodes;
the central collective logic selecting one of the up-tree path and down-tree path for one of the messages for each sender depending on a collective class map of said one of the messages;
routing messages from the leaf or intermediate nodes to the root node in an up tree direction;
processing the messages being routed from the leaf or intermediate nodes to the root node to form a processed message; and
sending the processed message back from the root node to at least one of the leaf, intermediate or root nodes.

7. The system according to claim 6, wherein said processing includes combining the messages from the leaf, intermediate and root nodes into one, combined message.

8. The system according to claim 6, wherein the sending includes sending the processed message from the root node to all the leaf, intermediate and root nodes in a down tree direction.

9. The system according to claim 8, wherein said adding further includes adding dedicated injection fifos and dedicated reception fifos for collective operations.

10. The system according to claim 9, wherein said adding further includes adding dedicated collective virtual channels to each of the receivers, and adding a central collective logic block to handle arbitration and collective data flow.

* * * * *